US00RE41494E

(19) United States
(12) Reissued Patent
Ahern et al.

(10) Patent Number: US RE41,494 E
(45) Date of Reissued Patent: Aug. 10, 2010

(54) EXTENDED CARDBUS/PC CARD CONTROLLER WITH SPLIT-BRIDGE TECHNOLOGY

(76) Inventors: Frank W. Ahern, 225 S. Valley View Rd., Payson, AZ (US) 85541; Doss Jeff, 12304 E. Pointsettia Dr., Scottsdale, AZ (US) 85259; Charles Mollo, 13602 N. 44th Street #181, Phoenix, AZ (US) 85032

(21) Appl. No.: 11/183,298

(22) Filed: Jul. 15, 2005

Related U.S. Patent Documents

Reissue of:
(64) Patent No.: 6,594,719
Issued: Jul. 15, 2003
Appl. No.: 09/559,677
Filed: Apr. 27, 2000

U.S. Applications:
(60) Provisional application No. 60/198,317, filed on Apr. 19, 2000.

(51) Int. Cl.
*G06F 13/00* (2006.01)

(52) U.S. Cl. ..... 710/300; 710/305; 710/306; 710/315

(58) Field of Classification Search ..... 710/315, 710/300, 305, 306, 7, 310, 311; 370/402, 370/413, 458; 375/221, 316; 380/37; 326/30; 712/35
See application file for complete search history.

(56) References Cited

U.S. PATENT DOCUMENTS 3,800,097 A 3/1974 Maruscak et al.
4,112,369 A 9/1978 Forman et al.
4,413,319 A 11/1983 Schultz et al.
4,504,927 A 3/1985 Callan
4,535,421 A 8/1985 Duwel et al.
4,591,660 A * 5/1986 Scordo ..... 380/37

(Continued)

FOREIGN PATENT DOCUMENTS

CN 1473292 2/2004

(Continued)

OTHER PUBLICATIONS

IEEE Microprocessor and Microcomputer Standards Committee, P1394a Draft Standard for a High Performance Serial Bus (Amendment), Feb. 11, 2000, IEEE Computer Society, Draft 5.0, pp. i–v, 131–134, 140, and 144–150.*

(Continued)

*Primary Examiner*—Glenn A Auve

(57) ABSTRACT

An improved extended cardbus/PC card controller (20) incorporating proprietary Split-Bridge™ high speed serial communication technology for interconnecting a conventional parallel system bus via a high speed serial link with a remote peripheral device. The extend cardbus/PC card controller is adapted to interface the parallel system bus, which may be PCI, PCMCIA, integrated, or some other parallel I/O bus architecture, with peripheral devices via PC cards, and now optionally via a high speed serial link using the proprietary serial Split-Bridge™ technology. The serial Split-Bridge™ technology provides real time interconnection between the parallel system bus and the remote device which may also be based on a parallel system data bus architecture, over a serial link, which serial link appears to be transparent between the buses and thus facilitates high speed data transfer exceeding data rates of 1.0 GigaHertz.

36 Claims, 3 Drawing Sheets

Split-Bridge

U.S. PATENT DOCUMENTS

| | | | | | |
|---|---|---|---|---|---|
| 4,787,029 | A | | 11/1988 | Khan | |
| 4,882,702 | A | | 11/1989 | Struger et al. | |
| 4,901,308 | A | | 2/1990 | Deschaine | |
| 4,941,845 | A | * | 7/1990 | Eppley et al. | |
| 4,954,949 | A | | 9/1990 | Rubin | |
| 4,959,833 | A | | 9/1990 | Mercola et al. | |
| 4,961,140 | A | | 10/1990 | Pechanek et al. | |
| 4,969,830 | A | * | 11/1990 | Daly et al. | |
| 5,006,981 | A | | 4/1991 | Beltz et al. | |
| 5,038,320 | A | | 8/1991 | Heath et al. | |
| 5,111,423 | A | | 5/1992 | Kopec, Jr. et al. | |
| 5,134,702 | A | | 7/1992 | Charych et al. | |
| 5,187,645 | A | * | 2/1993 | Spalding et al. | |
| 5,191,653 | A | * | 3/1993 | Banks et al. | |
| 5,191,657 | A | | 3/1993 | Ludwig et al. | |
| 5,237,690 | A | | 8/1993 | Bealkowski et al. | |
| 5,274,711 | A | | 12/1993 | Rutledge et al. | |
| 5,301,349 | A | | 4/1994 | Nakata et al. | |
| 5,313,589 | A | | 5/1994 | Donaldson et al. | |
| 5,325,491 | A | | 6/1994 | Fasig | |
| 5,335,326 | A | | 8/1994 | Nguyen et al. | |
| 5,335,329 | A | | 8/1994 | Cox et al. | |
| 5,357,621 | A | | 10/1994 | Cox | |
| 5,373,149 | A | * | 12/1994 | Rasmussen | |
| 5,377,184 | A | | 12/1994 | Beal et al. | |
| 5,430,847 | A | | 7/1995 | Bradley et al. | |
| 5,432,916 | A | * | 7/1995 | Hahn et al. | |
| 5,440,698 | A | | 8/1995 | Sindhu et al. | |
| 5,446,869 | A | | 8/1995 | Padgett et al. | |
| 5,452,180 | A | * | 9/1995 | Register et al. | |
| 5,457,785 | A | | 10/1995 | Kikinis et al. | |
| 5,469,545 | A | | 11/1995 | Vanbuskirk et al. | |
| 5,475,818 | A | | 12/1995 | Molyneaux et al. | |
| 5,477,415 | A | * | 12/1995 | Mitcham et al. | |
| 5,483,020 | A | | 1/1996 | Hardie et al. | |
| 5,488,705 | A | | 1/1996 | LaBarbera | |
| 5,495,569 | A | | 2/1996 | Kotzur | |
| 5,497,498 | A | | 3/1996 | Taylor | |
| 5,507,002 | A | | 4/1996 | Heil | |
| 5,517,623 | A | | 5/1996 | Farrell et al. | |
| 5,522,050 | A | | 5/1996 | Amini et al. | |
| 5,524,252 | A | | 6/1996 | Desai et al. | |
| 5,530,895 | A | | 6/1996 | Enstrom | |
| 5,540,597 | A | | 7/1996 | Budman et al. | |
| 5,542,055 | A | | 7/1996 | Amini et al. | |
| 5,548,730 | A | | 8/1996 | Young | |
| 5,555,510 | A | | 9/1996 | Verseput et al. | |
| 5,561,806 | A | | 10/1996 | Fitchett et al. | |
| 5,572,525 | A | | 11/1996 | Shen et al. | |
| 5,572,688 | A | | 11/1996 | Sytwu | |
| 5,579,489 | A | | 11/1996 | Dornier et al. | |
| 5,579,491 | A | * | 11/1996 | Jeffries et al. | |
| 5,586,265 | A | | 12/1996 | Beukema | |
| 5,590,377 | A | | 12/1996 | Smith | |
| 5,611,053 | A | | 3/1997 | Wu et al. | |
| 5,632,020 | A | * | 5/1997 | Gephardt et al. | |
| 5,634,080 | A | * | 5/1997 | Kikinis et al. | |
| 5,655,142 | A | | 8/1997 | Gephardt et al. | |
| 5,671,421 | A | | 9/1997 | Kardach et al. | |
| 5,694,556 | A | | 12/1997 | Neal et al. | |
| 5,696,911 | A | | 12/1997 | Fredriksson | |
| 5,696,949 | A | | 12/1997 | Young | |
| 5,701,483 | A | | 12/1997 | Pun | |
| 5,724,529 | A | * | 3/1998 | Smith et al. | |
| 5,736,968 | A | | 4/1998 | Tsakiris | |
| 5,748,921 | A | | 5/1998 | Lambrecht et al. | |
| 5,764,924 | A | | 6/1998 | Hong | |
| 5,774,681 | A | | 6/1998 | Kunishige | |
| 5,781,747 | A | * | 7/1998 | Smith et al. | 710/2 |
| 5,793,995 | A | | 8/1998 | Riley et al. | |
| 5,793,996 | A | | 8/1998 | Childers et al. | |
| 5,799,207 | A | | 8/1998 | Wang et al. | |
| 5,802,055 | A | | 9/1998 | Krein et al. | |
| 5,809,262 | A | | 9/1998 | Potter | |
| 5,815,677 | A | | 9/1998 | Goodrum | |
| 5,819,053 | A | | 10/1998 | Goodrum et al. | |
| 5,832,279 | A | | 11/1998 | Rostoker et al. | |
| 5,835,741 | A | | 11/1998 | Elkhoury et al. | |
| 5,854,908 | A | | 12/1998 | Ogilvie et al. | |
| 5,884,027 | A | | 3/1999 | Garbus et al. | |
| 5,905,870 | A | | 5/1999 | Mangin et al. | |
| 5,911,055 | A | | 6/1999 | Whiteman et al. | |
| 5,913,037 | A | | 6/1999 | Spofford et al. | |
| 5,941,965 | A | * | 8/1999 | Moroz et al. | |
| 5,948,076 | A | | 9/1999 | Anubolu et al. | |
| 5,953,511 | A | | 9/1999 | Sescila et al. | |
| 5,968,144 | A | | 10/1999 | Walker et al. | |
| 5,991,304 | A | * | 11/1999 | Abramson | 370/413 |
| 5,991,839 | A | | 11/1999 | Ninomiya | |
| 6,003,105 | A | | 12/1999 | Vicard et al. | |
| 6,026,075 | A | | 2/2000 | Linville et al. | |
| 6,031,821 | A | | 2/2000 | Kalkunte et al. | |
| 6,035,333 | A | | 3/2000 | Jeffries et al. | |
| 6,044,215 | A | | 3/2000 | Charles et al. | |
| 6,058,144 | A | * | 5/2000 | Brown | 375/316 |
| 6,070,214 | A | * | 5/2000 | Ahern | 710/315 |
| 6,084,856 | A | | 7/2000 | Simmons et al. | |
| 6,085,278 | A | | 7/2000 | Gates et al. | |
| 6,098,103 | A | | 8/2000 | Dreyer et al. | |
| 6,101,563 | A | | 8/2000 | Fields, Jr. et al. | |
| 6,115,356 | A | | 9/2000 | Kalkunte et al. | |
| 6,141,744 | A | * | 10/2000 | Wing So | 712/35 |
| 6,157,967 | A | | 12/2000 | Horst et al. | |
| 6,167,029 | A | | 12/2000 | Ramakrishnan | |
| 6,167,120 | A | | 12/2000 | Kikinis | |
| 6,170,022 | B1 | | 1/2001 | Linville et al. | |
| 6,201,829 | B1 | * | 3/2001 | Schneider | 375/221 |
| 6,216,185 | B1 | | 4/2001 | Chu | |
| 6,222,825 | B1 | | 4/2001 | Mangin et al. | |
| 6,233,639 | B1 | | 5/2001 | Dell et al. | |
| 6,237,046 | B1 | | 5/2001 | Ohmura et al. | |
| 6,247,086 | B1 | | 6/2001 | Allingham | |
| 6,247,091 | B1 | | 6/2001 | Lovett | |
| 6,256,691 | B1 | | 7/2001 | Moroz et al. | |
| 6,260,092 | B1 | | 7/2001 | Story et al. | |
| 6,263,385 | B1 | | 7/2001 | Gulick et al. | |
| 6,263,397 | B1 | | 7/2001 | Wu et al. | |
| 6,275,888 | B1 | | 8/2001 | Porterfield | |
| 6,295,281 | B1 | | 9/2001 | Itkowsky et al. | |
| 6,333,929 | B1 | | 12/2001 | Drottar et al. | |
| 6,366,951 | B1 | | 4/2002 | Schmidt | |
| 6,381,661 | B1 | | 4/2002 | Messerly et al. | |
| 6,385,671 | B1 | | 5/2002 | Hunsaker et al. | |
| 6,401,157 | B1 | | 6/2002 | Nguyen et al. | |
| 6,418,492 | B1 | | 7/2002 | Papa | |
| 6,418,494 | B1 | | 7/2002 | Remigius | |
| 6,421,352 | B1 | | 7/2002 | Manaka et al. | |
| 6,425,033 | B1 | | 7/2002 | Conway et al. | |
| 6,430,635 | B1 | | 8/2002 | Kwon et al. | |
| 6,445,711 | B1 | * | 9/2002 | Scheel et al. | 370/402 |
| 6,446,192 | B1 | | 9/2002 | Narasimhan et al. | |
| 6,452,927 | B1 | | 9/2002 | Rich | |
| 6,456,590 | B1 | | 9/2002 | Ren et al. | |
| 6,457,081 | B1 | | 9/2002 | Gulick | |
| 6,457,091 | B1 | | 9/2002 | Lange et al. | |
| 6,473,810 | B1 | * | 10/2002 | Patel et al. | 710/7 |
| 6,493,745 | B1 | | 12/2002 | Cherian | |
| RE37,980 | E | * | 2/2003 | Elkhoury et al. | 710/310 |
| 6,567,876 | B1 | | 5/2003 | Stufflebeam | |
| 6,578,101 | B1 | | 6/2003 | Ahern | |
| 6,581,125 | B1 | * | 6/2003 | Lange et al. | 710/305 |

| | | | | |
|---|---|---|---|---|
| 6,594,719 | B1 | 7/2003 | Ahern et al. | |
| 6,671,737 | B1 | 12/2003 | Snowdon et al. | |
| 6,715,022 | B1 | 3/2004 | Ahern | |
| 6,728,822 | B1 * | 4/2004 | Sugawara et al. | 710/311 |
| 6,778,543 | B1 * | 8/2004 | Frouin et al. | 370/402 |
| 6,788,101 | B1 * | 9/2004 | Rahman | 326/30 |
| 6,950,440 | B1 * | 9/2005 | Conway | 370/458 |
| 7,047,326 | B1 | 5/2006 | Crosbie et al. | |
| 7,269,680 | B1 | 9/2007 | Ahern | |
| 7,356,634 | B2 | 4/2008 | Ahern | |
| 7,657,678 | B2 | 2/2010 | Ahern | |
| 2001/0011312 | A1 | 8/2001 | Chu | |
| 2001/0037423 | A1 | 11/2001 | Conway et al. | |
| 2002/0078289 | A1 * | 6/2002 | Morrow | 710/300 |
| 2002/0135536 | A1 | 9/2002 | Bruning | |
| 2004/0088452 | A1 | 5/2004 | Scott | |
| 2005/0036509 | A1 | 2/2005 | Acharya et al. | |
| 2005/0129385 | A1 | 6/2005 | Speasl et al. | |
| 2005/0174488 | A1 | 8/2005 | Chennakeshu | |
| 2006/0075166 | A1 | 4/2006 | Grassian | |

FOREIGN PATENT DOCUMENTS

| | | | |
|---|---|---|---|
| DE | 19829212 | | 1/2000 |
| EP | 0820021 | | 1/1998 |
| EP | 820021 | | 1/1998 |
| EP | 0844567 | | 5/1998 |
| EP | 1374024 | | 1/2004 |
| JP | 02-140852 | * | 5/1990 |
| JP | 3253960 | | 11/1991 |
| JP | 3001429 | * | 2/1994 |
| JP | 06-028307 | * | 2/1994 |
| JP | 59184903 | | 10/1994 |
| JP | 9081504 | | 3/1997 |
| JP | 9097125 | | 4/1997 |
| JP | 10049379 | | 2/1998 |
| JP | 10124451 | | 5/1998 |
| JP | 2003050661 | | 2/2003 |
| JP | 2004531803 | | 10/2004 |
| WO | WO-9302420 | | 2/1993 |
| WO | WO-9700481 | | 1/1997 |
| WO | WO-0161512 | | 8/2001 |
| WO | WO-0161513 | | 8/2001 |
| WO | WO-02077785 | | 10/2002 |

OTHER PUBLICATIONS

"Notice of allowance", Appl. No. 11/300,131, (Dec. 4, 2009), 4 pages.
"Non Final Office Action", U.S. Appl. No. 09/559,678, (Oct. 30, 2008), 8 pages.
"Non Final Office Action", U.S. Appl. No. 09/559,678, (Mar. 27, 2008), 9 pages.
"Final Office Action", U.S. Appl. No. 09/559,678, (Aug. 20, 2007), 8 pages.
"Non Final Office Action", U.S. Appl. No. 09/559,678, (Nov. 24, 2006), 9 pages.
"Non Final Office Action", U.S. Appl. No. 09/559,678, (May 2, 2006), 7 pages.
"Final Office Action", U.S. Appl. No. 09/559,678, (Nov. 8, 2005), 7 pages.
"Non Final Office Action", U.S. Appl. No. 09/559,678, (Mar. 8, 2008), 8 pages.
"Final Office Action", U.S. Appl. No. 09/559,678, (Jun. 22, 2004), 7 pages.
"Non Final Office Action", U.S. Appl. No. 09/559,678, (Sep. 17, 2005), 7 pages.
"Non Final Office Action", U.S. Appl. No. 09/559,678, (Dec. 4, 2002), 9 pages.
"Non Final Office Action", U.S. Appl. No. 11/513,806, (Mar. 12, 2007), 10 pages.
"Final Office Action", U.S. Appl. No. 11/513,806, (Sep. 27, 2007), 8 pages.
"Advisory Action", U.S. Appl. No. 11/513,806, PTOL 303, (Apr. 10, 2008), 4 pages.
"Non Final Office Action", U.S. Appl. No. 11/513,806, (Oct. 2, 2008), 22 pages.
"Non Final Office Action", U.S. Appl. No. 11/300,131, (Dec. 15, 2006), 13 pages.
"Final Office Action", U.S. Appl. No. 11/300,131, (Aug. 20, 2007), 9 pages.
"Non Final Office Action", U.S. Appl. No. 11/300,131, (Mar. 27, 2008), 12 pages.
"Non Final Office Action", U.S. Appl. No. 11/300,131, (Nov. 12, 2008), 20 pages.
"Non Final Office Action", U.S. Appl. No. 10/766,660, (May 15, 2006),17 pages.
"Final Office Action", U.S. Appl. No. 10/766,660, (Dec. 4, 2006),17 pages.
"Non Final Office Action", U.S. Appl. No. 09/130,057, (Jul. 21, 1999),27 pages.
"Notice of Allowance", U.S. Appl. No. 09/130,057, (Feb. 25, 2000),12 pages.
"Non Final Office Action", U.S. Appl. No. 10/782,082, (Jun. 9, 2006),17 pages.
"Final Office Action", U.S. Appl. No. 10/782,082, (Mar. 6, 2007),14 pages.
"Advisory Action", U.S. Appl. No. 10/782,082, (Jul. 9, 2007),3 pages.
"Non Final Office Action", U.S. Appl. No. 10/782,082, (Nov. 9, 2007),12 Pages.
"Final Office Action", U.S. Appl. No. 10/782,082, (Aug. 11, 2008),26 pages.
"Final Office Action", U.S. Appl. No. 10/782,082, (Feb. 2, 2009),27 pages.
"Non Final Office Action", U.S. Appl. No. 09/559,677, (Jun. 26, 2002),4 pages.
"Non Final Office Action", U.S. Appl. No. 09/559,677, (Dec. 12, 2002),5 pages.
"Notice of Allowance", U.S. Appl. No. 09/559,677, (Mar. 20, 2003),3 pages.
"PCI to PCI Bridge Architecture Specification", *Author—PCI Special Interest Group Revision 1.0*, (Apr. 5, 1994),26 pages.
"PCI–to–PCI Bridge Architecture Specification", *PCI Local Bus*; XP–002382184; Revision 1.1, (Dec. 18, 1998),148 pages.
"Non Final Office Action", U.S. Appl. No. 09/819,053, (Apr. 22, 2004),12 pages.
"Final Office Action", U.S. Appl. No. 09/819,053, (Jul. 12, 2005),46 pages.
"Non Final Office Action", U.S. Appl. No. 09/819,053, (Mar. 2, 2006),14 pages.
"Notice of Allowance", U.S. Appl. No. 09/819,053, (Jun. 15, 2007),13 pages.
"Patent Abstract of Japan vol. 2003, No. 6, Jun. 3, 2003 & JP 2003 050661", *Casio Computer Co., Ltd.,* (Feb. 21, 2003),1 page.
"International Search Report", PCT/US2005/006089, (Jun. 12, 2005),4 pages.

Fulp, C. D., et al., "A Wireless Handheld System for Interactive Multimedia–Enhanced Instruction", FIE 2002. 32nd Annual Frontiers In Education Conference, Boston, MA., Nov. 6–9, 2002, Frontiers In Education Conference, New York, NY: IEEE, US, vol. 1 of 3, Conf. 32, (Nov. 6, 2002),4 pages.

"Notice of Allowance", U.S. Appl. No. 09/819,057, (Mar. 14, 2003),4 pages.

"Non Final Office Action", U.S. Appl. No. 09/819,057, (Nov. 26, 2002),7 pages.

"Notice of Allowance", U.S. Appl. No. 09/819,054, (Dec. 2, 2003),8 pages.

"Non Final Office Action", U.S. Appl. No. 09/819,054, (Jan. 28, 2003),11 pages.

"Notice of Allowance", U.S. Appl. No. 09/130,058, (Feb. 25, 2000),4 pages.

"Non Final Office Action", U.S. Appl. No. 09/130,058, (Jul. 21, 1999),32 pages.

"Non Final Office Action", U.S. Appl. No. 11/513,976, (Oct. 27, 2006),10 pages.

"Notice of Allowance", U.S. Appl. No. 11/513,976, (Jan. 16, 2008),7 pages.

"Foreign Office Action", Application Serial No. 2,445,711, (Mar. 18, 2009),2 pages.

"Notice of Allowance/Base Issue Fee", U.S. Appl. No. 11/300,131, (Jun. 18, 2009),12 pages.

"Advisory Action", U.S. Appl. No. 10/782,082, (Apr. 7, 2009),3 pages.

"Notice of Allowance", U.S. Appl. No. 09/559,678, (Jun. 26, 2009),4 pages.

"International Search Report", EP01925078, (Oct. 30, 2001),2 Pages.

"International Search Report", PCT/US2001/12678, (Oct. 30, 2001),2 pages.

"European Search Report", EP07000788, (Oct. 1, 2008),1 Pages.

"International Search Report", PCT/US2001/12666, (Nov. 15, 2001),2 pages.

"Allowed Claims", U.S. Appl. No. 09/559,678, (Jun. 26, 2009),9 pages.

"Allowed Claims", U.S. Appl. No. 11/300,131, (Jun. 18, 2009),7 pages.

Gillett, Richard B., "Memory Channel Network for PCI", IEEE 1996, (1996),7 pages.

Ekiz, H. et al., "Performance Analysis of a CAN/CAN Bridge", IEEE 1996, describes a Bridge Process Model with Bridge Port A and Bridge Port B. The Bridge Port A connects to a LAN 1 Data Lin. Next, the Bridge Port B connects to a LAN 2 Data Link (see fig. 2).,(1996),8 pages.

Marsden, Philip "Interworking IEEE 802/FDDI LAN's Via the ISDN Frame Relay Bearer Service", *Proceedings of the IEEE*, vol. 79, No. 2, Feb. 1991, *describes ISDN MAC Bridge/Routers. The Bridge/Router connects directly to each other via 2Mbit/s ISDN interface* (*see fig.* 6), (Feb. 1991),p. 223–229.

Gillett, Richard B., et al., "Using the Memory Channel Network", IEEE 1997, (1997),p. 19–25.

Annamalai, Kay "Multi–ported PCI–to–PCI Bridge Chip", IEEE 1997, (1997),p. 426–433.

Mora, F et al., "Design of a high performance PCI interface for an SCI network", Computing & Control Engineering Journal, Dec. 1998., (Dec. 1998),p. 275–282.

Skaali, B et al., "A Prototype DAQ System for the Alice Experiment Based on SCI", *IEEE Transactions on Nuclear Science*, vol. 45, Aug. 1998, (Aug. 1998), 1917–1922.

Mora, F et al., "Electronic Design of a High Performance Interface to the SCI Network", IEEE 1998, (1998),p. 535–538.

Harper, Stephen "Update on PCMCIA Standard Activities: Cardbus and Beyond", PCMCIA 1995, (1995),p. 136–144.

Bui, et al., "60x Bus–to–PCI Bridge", IBM TDB May 1995, (May 1995),p. 401–402.

Anon, "Remote Memory Access Interface Between Two Personal Computers", *IBM Technical Disclosure Bulletin v 28 n* Feb. 9, 1986, (1986),4110–4113.

Karl, Wolfgang et al., "SCI monitoring hardware and software: supporting performance evaluation and debugging", Book Title: SCI: scalable coherent interface. Architecture and software for high–performance compute cluster,(1999), p. 417–432.

Poor, Alfred "The Expansion Bus.(ISA, PCI, and AGP)(Technology Information)", *PC Magazine*, 194(1) Jan. 19, 1999, (Jan. 19, 1999),5 pages.

Surkan, Michael "NetFrame takes lead in reliability: ClusterSystem's hot–swappable PCI a", *PC Week*, v14, n34, p60(1) Aug. 11, 1997, NetFRAME System' ClusterSystem 9008 Pentium Pro–based system) (Hardware Review) (Evaluation),(Aug. 11, 1997),4 pages.

Balatsos, A et al., "A bridge for a multiprocessor graphics system", *Proceedings of the 2002 IEEE Canadian Conference on Electrical and Computer Engineering*, (2002),p. 646–650.

"MC68HC11A8—HCMOS Single–Chip Microcontroller", *Motorola, Inc.* 1996, (1996),158 pages.

"Foreign Office Action", Application Serial No. 2001–560830, (Mar. 19, 2009), 3 pages.

"Foreign Office Action", Application Serial No. 2001–560831, (Mar. 19, 2009), 3 pages.

"Foreign Office Action", Application Serial No. 2006–203273, (Jul. 21, 2009), 10 pages.

"Foreign Office Action", Application Serial No. 2006–203293, (Jun. 26, 2009), 9 pages.

"Notice of Allowance", U.S. Appl. No. 11/300,131, (Oct. 22, 2009), 4 pages.

"Notice of Allowance", U.S. Appl. No. 09/559,678, (Oct. 26, 2009), 4 pages.

"PCI–to–PCI Bridge Architecture Specification", *Chapter 5—Buffer Management*, Tables 5–1, (Dec. 18, 1998),pp. 69–92.

Brochure entitled "Card Station Expanding Your Portable World" Axonix Corporation 1994.*

Anderson, et al "CardBus System Architecture" pp. 150–153, 194–201, 228–231, 322–325,1995.*

Anderson, Don "PCMCIA System Architecture" 16–Bit PC Cards, $2^{nd}$ Edition, pp. 146–167, 214–215, 218–225, 296–297, 1995.*

Kitamura, et al "Design of the ISDN PC Card" NTT Human Interface Laboratory, Japan pp. 1169–1174, 1994.*

Adaptec, "Hardware Istallation Guide" CardPark APA–4510, ISA–to–PCMCIA Card Adapter for Desktop PC's, pp. 1–7.*

Adaptec, "SlimSCSI 1460 For Fast, Easy Connections to All SCSI Devices" 6 pages.*

Edge: Work–Group Computing Report, Nov. 21, 1994 "PCMCIA: Adaptec targets mobile computing market with two new host adapters that relieve problem of system–to–system and peripheral connectivity" 2 pages.*

"Notice of Allowance", U.S. Appl. No. 09/559,678, (Jan. 29, 2010), 4 pages.

* cited by examiner

Upgrades require Total System Replacement

Split-Bridge

Extended Cardbus/PC Card Controller

EXTENDED CARDBUS/PC CARD CONTROLLER WITH SPLIT-BRIDGE TECHNOLOGY

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority of provisional patent application serial No. 60/198,317 entitled Split-Bridge Systems, Applications and Methods of Use filed on Apr. 19, 2000, as well as co-pending and commonly assigned patent applications Ser. No. 09/130,057 filed Jun. 6, 1998, Ser. No. 09/130,058 filed Jun. 6, 1998, Ser. No. 08/679,131 now issued as U.S. Pat. No. 5,941,965; and co-pending patent application Ser. No. 09/559,678, entitled Modular Computer Based on Universal Connectivity Station, the teachings of each incorporated herein by reference.

FIELD OF THE INVENTION

The present invention is generally related to data processing systems, and more particularly to computer systems having at least one host processor and connectable to a plurality of peripherals devices including notebook computers, storage devices, displays, keyboards, mouse's and so forth.

BACKGROUND OF THE INVENTION

Computer systems today are powerful, but are rendered limited in adapting to changing computing environments. The PCI bus is pervasive in the industry, but as a parallel data bus is not easily bridged to other PCI based devices. Full bridges are known, such as used in traditional laptop computer/docking stations. However, separating the laptop computer from the docking station a significant distance has not been possible. Moreover, the processing power of computer systems has been resident within the traditional computer used by the user because the microprocessor had to be directly connected to and resident on the PCI motherboard. Thus, upgrading processing power usually meant significant costs and/or replacing the computer system.

PCI

The PCI bus is primarily a wide multiplexed address and data bus that provides support for everything from a single data word for every address to very long bursts of data words for a single address, with the implication being that burst data is intended for sequential addresses. Clearly the highest performance of the PCI bus comes from the bursts of data, however most PCI devices require reasonable performance for even the smallest single data word operations. Many PCI devices utilize only the single data mode for their transfers. In addition, starting with the implementation of the PCI 2.1 version of the specification, there has been at least pseudo isochronous behavior demanded from the bus placing limits on an individual device's utilization of the bus, thus virtually guaranteeing every device gets a dedicated segment of time on a very regular interval and within a relatively short time period. The fundamental reason behind such operation of the PCI bus is to enable such things as real time audio and video data streams to be mixed with other operations on the bus without introducing major conflicts or interruption of data output. Imagine spoken words being broken into small unconnected pieces and you get the picture. Prior to PCI 2.1 these artifacts could and did occur because devices could get on the bus and hold it for indefinite periods of time. Before modification of the spec for version 2.1, there really was no way to guarantee performance of devices on the bus, or to guarantee time slot intervals when devices would get on the bus. Purists may argue that PCI is still theoretically not an isochronous bus, but as in most things in PC engineering, it is close enough.

Traditional High Speed Serial

Typical high speed serial bus operation on the other hand allows the possibility of all sizes of data transfers across the bus like PCI, but it certainly favors the very long bursts of data unlike PCI. The typical operation of a serial bus includes an extensive header of information for every data transaction on the bus much like Ethernet, which requires on the order of 68 bytes of header of information for every data transaction regardless of length. In other words, every data transaction on Ethernet would have to include 68 bytes of data along with the header information just to approach 50% utilization of the bus. As it turns out Ethernet also requires some guaranteed dead time between operations to "mostly" prevent collisions from other Ethernet devices on the widely disperse bus, and that dead time further reduces the average performance.

The typical protocol for a serial bus is much the same as Ethernet with often much longer header information. Virtually all existing serial bus protocol implementations are very general and every block of data comes with everything needed to completely identify it. FiberChannel (FC) has such a robust protocol that virtually all other serial protocols can be transmitted across FC completely embedded within the FC protocol, sort of like including the complete family history along with object size, physical location within the room, room measurements, room number, street address, city, zip code, country, planet, galaxy, universe, . . . etc. and of course all the same information about the destination location as well, even if all you want to do is move the object to the other side of the same room. Small transfers across all of these protocols, while possible, are extremely expensive from a bandwidth point of view. Of course the possibility of isochronous operation on the more general serial bus is not very reasonable.

Recreating High Speed Serial for PCI

In creating the proprietary Split-Bridge™ technology, Mobility electronics of Phoenix, Ariz., the present applicant, actually had to go back to the drawing board and design a far simpler serial protocol to allow a marriage to the PCI bus, because none of the existing implementations could coexist without substantial loss of performance. For a detailed discussion of Applicant's proprietary Split-Bridge™ technology, cross reference is made to Applicant's co-pending commonly assigned patent applications identified as Ser. No. 09/130,057 and 09/130,058 both filed Jun. 6, 1998, the teachings of each incorporated herein by reference. The Split-Bridge™ technology approach is essentially custom fit for PCI and very extensible to all the other peripheral bus protocols under discussion like PCIx, and LDT™ of AMD corporation. Split-Bridge™ technology fundamentals are a natural for extending anything that exists within a computer. It basically uses a single-byte of overhead for 32 bits of data and address—actually less when you consider that byte enables, which are not really "overhead", are included as well.

Armed with the far simpler protocol, all of the attributes of the PCI bus are preserved and made transparent across a high speed serial link at much higher effective bandwidth than any existing serial protocol. The net result is the liberation of a widely used general purpose bus, and the new found ability to separate what were previously considered fundamental inseparable parts of a computer into separate locations. When the most technical reviewers grasp the magnitude of the invention, then the wheels start to turn and the discussions that follow open up a new wealth of opportunities. It now becomes reasonable to explore some of the old fundamentals, like peer-to-peer communication between computers that has been part of the basic PCI specification from the beginning, but never really feasible because of the physical limits of the bus prior to Split-Bridge™ technology. The simplified single-byte overhead also enables very efficient high speed communication between two computers and could easily be extended beyond PCI.

The proprietary Split-Bridge™ technology is clearly not "just another high speed link" and distinguishing features that make it different represent novel approaches to solving some long troublesome system architecture issues.

First of all is the splitting of a PCI bridge into two separate and distinct pieces. Conceptually, a PCI bridge was never intended to be resident in two separate modules or chips and no mechanism existed to allow the sharing of setup information across two separate and distinct devices. A PCI bridge requires a number of programmable registers that supply information to both ports of a typical device. For the purpose of the following discussion, the two ports are defined into a north and south segment of the complete bridge.

The north segment is typically the configuration port of choice and the south side merely takes the information from the registers on the north side and operates accordingly. The problem exists when the north and south portions are physically and spatially separated and none of the register information is available to the south side because all the registers are in the north chip. A typical system solution conceived by the applicant prior to the invention of Split-Bridge™ technology would have been to merely create a separate set of registers in the south chip for configuration of that port. However, merely creating a separate set of registers in the south port would still leave the set up of those registers to the initialization code of the operating system and hence would have required a change to the system software.

Split-Bridge™ technology, on the other hand, chose to make the physical splitting of the bridge into two separate and spaced devices "transparent" to the system software (in other words, no knowledge to the system software that two devices were in fact behaving as one bridge chip). In order to make the operations transparent, all accesses to the configuration space were encoded, serialized, and "echoed" across the serial link to a second set of relevant registers in the south side. Such transparent echo between halves of a PCI bridge or any other bus bridge is an innovation that significantly enhances the operation of the technology.

Secondly, the actual protocol in the Split-Bridge™ technology is quite unique and different from the typical state of the art for serial bus operations. Typically transfers are "packetized" into block transfers of variable length. The problem as it relates to PCI is that the complete length of a given transfer must be known before a transfer can start so the proper packet header may be sent.

Earlier attempts to accomplish anything similar to Split-Bridge™ technology failed because the PCI bus does not inherently know from one transaction to the next when, or if, a transfer will end or how long a block or burst of information will take. In essence the protocol for the parallel PCI bus (and all other parallel, and or real time busses for that matter) is incompatible with existing protocols for serial buses.

An innovative solution to the problem was to invent a protocol for the serial bus that more or less mimics the protocol on the PCI. With such an invention it is now possible to substantially improve the performance and real time operation here to for not possible with any existing serial bus protocol.

The 8 bit to 10 bit encoding of the data on the bus is not new, but follows existing published works. However, the direct sending of 32 bits of information along with the 4 bits of control or byte enables, along with an additional 4 bits of extension represents a 40 bit for every 36 bits of existing PCI data, address, and control or a flat 10% overhead regardless of the transfer size or duration, and this approach is new and revolutionary. Extending the 4 bit extension to 12 or more bits and include other functionality such as error correction or retransmit functionality is also within the scope of the Split-Bridge™ technology.

New Applications of the Split-Bridge™ Technology

Basic Split-Bridge™ technology was created for the purpose of allowing a low cost, high speed universal dock solution for all laptop computers and it has accomplished that task very well. By taking advantage of the standard and pervasive nature of the PCI bus in many other applications in computing, dramatic improvements in the price performance for other machines can be realized as well. The present invention is rendered possible due to the attributes of applicant's proprietary Split-Bridge™ technology.

SUMMARY OF THE INVENTION

The present invention achieves technical advantages as an improved extended cardbus/PC card controller incorporating the proprietary serial high speed Split-Bridge™ technology providing serial communications between a parallel system bus and a remote peripheral device. The improved controller includes the conventional system frontside controls, I/O controls, a cardbus translator having PC card slots adapted to receive a PCMCIA card or cards, and one end of the split bridge serial communication link comprising the proprietary serial Split-Bridge™ technology. The controller may further include super I/O circuitry for communicating remote I/O devices with the system bus as the super I/O devices become more readily available in the market.

DETAILED DESCRIPTION OF THE PREFERRED EMBODIMENT

Figure 1:
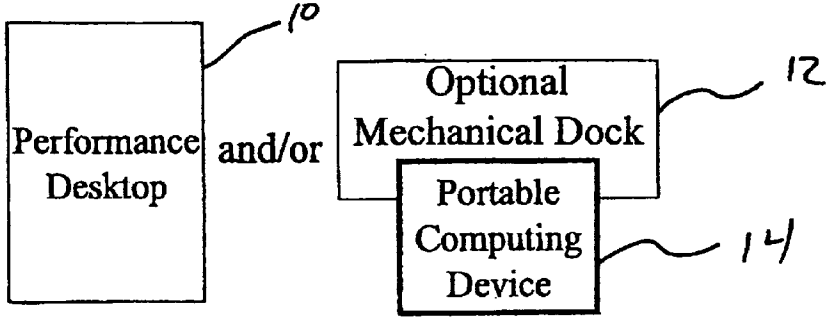
FIGURE 1 (PRIOR ART)
FIG. 1 illustrates prior art computer systems depicted as a traditional performance desk top computer shown at 10, and a portable computing device 12, such as a notebook or laptop computer, mechanically coupled to mechanical docking station 14.
Figure 2:
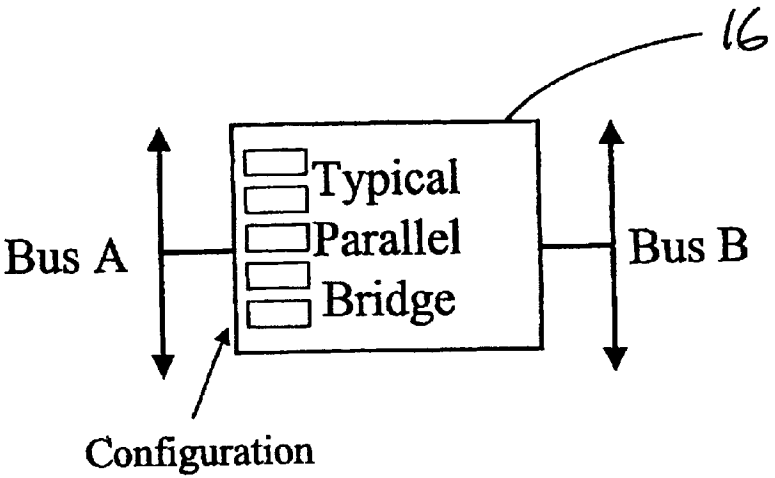
Figure 2 (PRIOR ART)
FIG. 2 is a block diagram of a prior art bridge 16 used to couple two system computing buses, such as used between the portable computing device 12 and the mechanical docking station 14 shown in FIG. 1.
Figure 3:
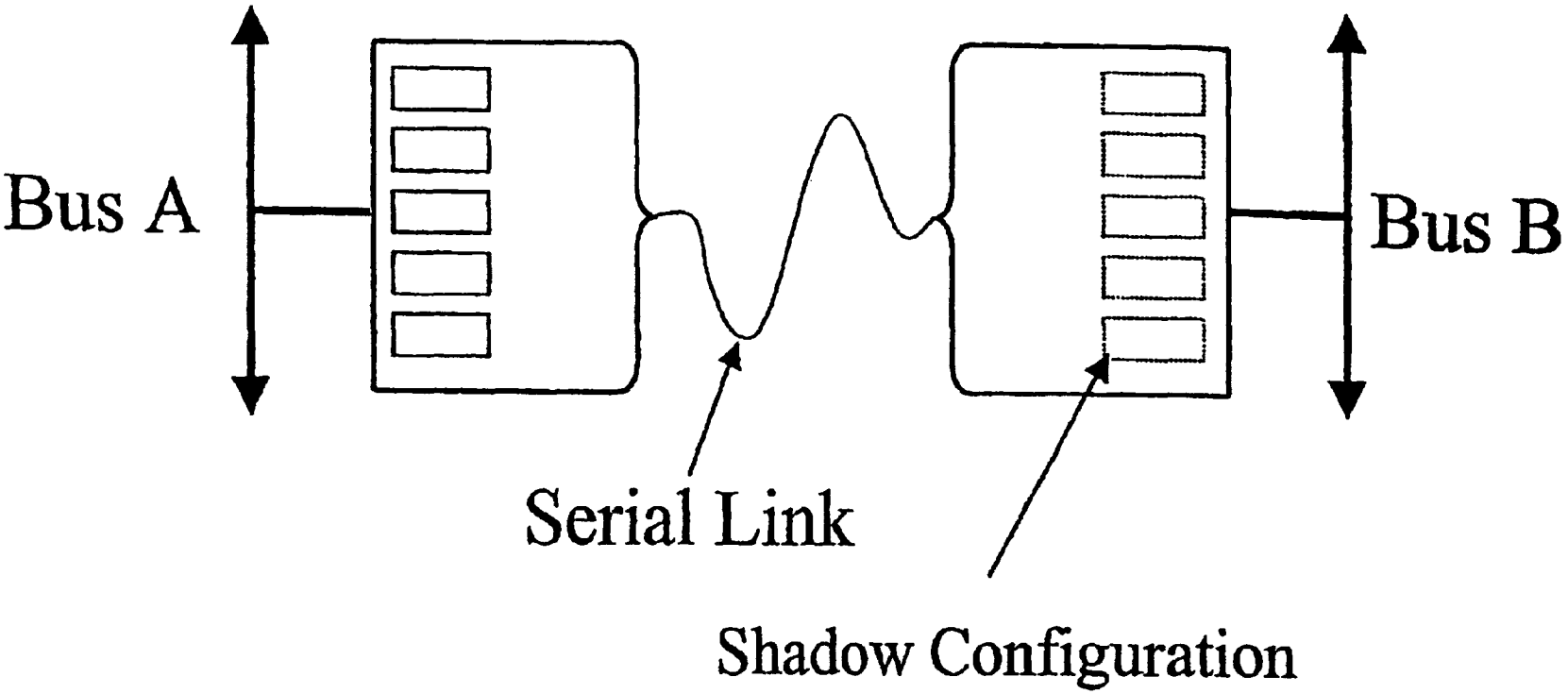
FIG. 3 illustrates the proprietary Split-Bridge™ technology serial communication technology of the applicant enabling high speed serial communications within the modular computer system of the present invention.

Referring to FIG. 3, there is depicted the proprietary Split-Bridge™ technology serial communications technology of the present applicant, discussed in great detail in commonly assigned U.S. patent applications Ser. No. 09/130,057 filed Jun. 6, 1998, and Ser. No. 09/130,058 also filed Jun. 6, 1998 the teachings of which are incorporated herein by reference.

Applicant's Split-Bridge™ technology revolutionizes the status quo for computer systems. The Split-Bridge™ technology does not require the need for custom hardware or custom software to achieve full performance serial communication between devices, including devices having parallel data buses including the PCI bus. In fact, for each device in a modular computer system, the Split-Bridge™ technology appears just like a standard PCI bridge, and all software operating systems and device drivers already take such standard devices into consideration. By utilizing standard buses within each device operating within the modular computer system, each device does not require any additional support from the Operating System (OS) software. The modular computing system has simple elegance, allowing the PCI bus which is so pervasive in the computer industry, that possible applications of the initial PCI form of Split-Bridge™ technology are all most limitless.

Originally implemented in PCI, there is nothing fundamental that ties the Split-Bridge™ technology to PCI, and thus, the Split-Bridge™ technology can migrate as bus architectures grow and migrate. The 64 bit PCI is compatible with the Split-Bridge™ technology, as is future PCIx and/or LDT™ that are currently under consideration in the industry and which are straight forward transitions of the Split-Bridge™ technology. Implementations with other protocols or other possible and natural evolutions of the Split-Bridge™ technology.

Figure 5:
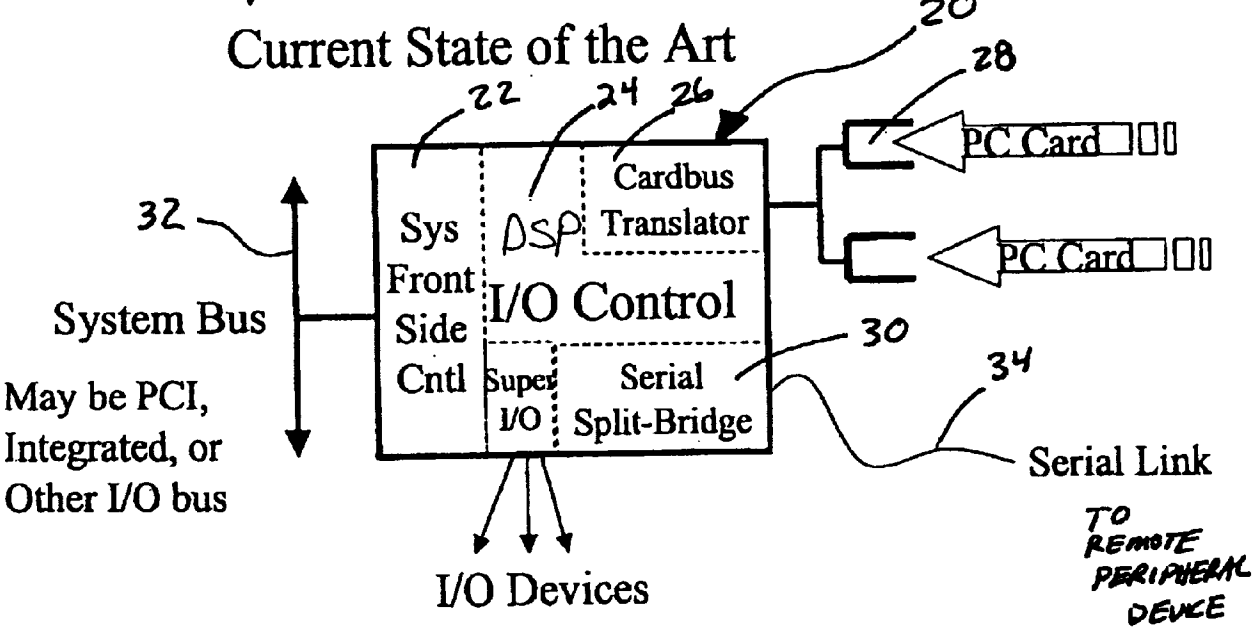
FIG. 5 is a block diagram of an improved extended cardbus/PC card controller having an integrated serial Split-Bridge™ interface according to the preferred embodiment of the present invention.

Referring to FIG. 5, there is depicted generally at 20 an improved card/bus controller according to the preferred embodiment of the present invention. Cardbus controller 20 is seen to have conventional system front side control circuitry 22, input/output (I/O) control circuitry 24 a cardbus translator circuitry 26 adapted to couple to and communicably interface with one or more PC cards inserted into respective slots 28, and being improved to include a serial Split-Bridge™ interface generally show at 30. The serial Split-Bridge™ interface portion 30 is adapted to serially communicate data and control signals between the parallel system bus 32 via a duplex serial link 34 to a remote peripheral device (not shown) converting the parallel data to outgoing serial data and converting incoming serial data to parallel data.

The proprietary Split-Bridge™ technology, when employed in the extended cardbus/PC card controller 20, significantly expands the interconnectivity of a standard communications network by allowing devices accessing the parallel systems bus 32 to communicate with a variety of external devices via PC cards, an extended cardbus, or advantageously via a serial link when employing the high speed serial Split-Bridge™ technology according to the present invention.

All of the electronics comprising the controller 20 can be embodied in discrete circuitry, in an application specific integrated circuit (ASIC), or combination thereof, to provide the multi-function interface capability between the parallel system bus 32 and remote peripheral devices. By employing a serial Split-Bridge™ technology interface 30 in a controller 30 with commercially available custom electronic control circuitry since much of such as Cardbus, the controller 20 can communicate with either Cardbus or PCMCIA, or via the serial link Split-Bridge™ remote PCI devices. Since much of the PCI interface electronics are commonly used by the respective interfaces, the integrating of the circuitry 30 is very economical.

Figure 4:
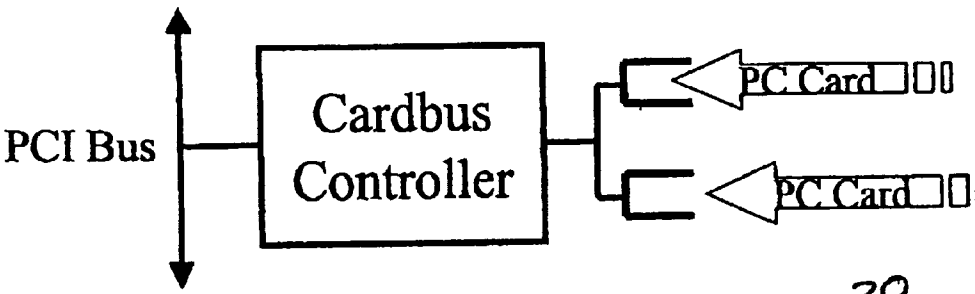
FIG. 4 is a diagram of a conventional cardbus/PC controller.

The present invention 20 facilitates the evolution of information transfer to offer high speed serial link connectivity exceeding data rates of 1.0 GHZ for use with PCI, Cardbus, integrated, or other parallel I/O bus architectures. Moreover, conventional digital signal processors, such as those manufactured by Texas Instruments Incorporated of Dallas, Tex., (DSPs) being employed on extended Cardbus/PC card controllers are well adapted to interface with and incorporate the serial Split-Bridge™ technology interface. Integrating commercially available Cardbus/PC card controller electronics with the proprietary serial Split-Bridge™ technology significantly improves performance and available features of the device 30 with nominal additional cost associated therewith. In fact, the price versus performance improvement of the present invention shown in FIG. 4 is a quantum leap over existing price-performance points.

The Split-Bridge™ serial interface electronics 30 can be designed into a custom Application Specific Integrated Circuit (ASIC) along with other electronics, moreover, multiple interfaces 30 can be employed on to a single controller 20 and multiplexed to interface with multiple internal or external devices and users. Accordingly, limitation to integration of a single Split-Bridge™ interface is not to be inferred, but rather parallel buses and possibly future general serial buses, can be interfaced to other devices using the proprietary Split-Bridge™ serial technology.

In summary, the improved Cardbus/PC card controller 20 facilitates improved connectivity between a system parallel bus and remote peripheral devices, allowing data connectivity via either the proprietary serial Split-Bridge™ technology, or via the standard PC card slots such as those based on the PCMCIA standards. Existing electronics, including DSPs, are well adapted to interface with ASICs or other discrete/custom componentry comprising the interface and employing the serials Split-Bridge™ technology.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An interface comprising:

first electronics adapted to interface parallel data from a parallel data bus to a first bus; and second electronics [adapted] *configured* to interface *said* parallel data from said parallel data bus into serial data [adapted] *and configured* to interface with a second remote bus, said second electronics *configured to* convert[ing] said parallel data *in*to said serial data *and, without inserting bus wait states, send said serial data to said second remote bus* without requiring any external signal from said second remote bus.

2. The interface as specified in claim 1 wherein said second electronics comprises [Split-Bridge™] *split-bridge* serial interface electronics.

3. The interface as specified in claim 1 wherein said parallel data bus is based on PCI-*type* or PCMCIA-*type* interface standards.

4. The interface as specified in claim 1 wherein said serial data has a serial data rate exceeding 1.0 Giga bits/second.

5. The interface as specified in claim 1 wherein said first electronics comprises a digital signal processor (DSP).

6. The interface card as specified in claim 1 wherein said first electronics comprises Cardbus electronics.

7. The interface card as specified in claim 1 wherein said first electronics and said second electronics are adapted to [concurrently] support transfer of data to said [respective] first *bus* and *said* second [buses] *remote bus*, *respectively*.

8. A method of interfacing parallel data on a parallel system bus to a first bus and a second remote bus, comprising the steps of:

a) converting a first portion of the parallel data on the parallel system bus to parallel data adapted to communicate with said first bus; and b) converting a second portion of the parallel data on the parallel system bus to high-speed serial data, which said serial data is sent*, without inserting bus wait states, to the second remote bus* without requiring or receiving a signal from said second remote bus before sending said serial data.

9. The method as specified in claim 8 further comprising the step of using a [Split-Bridge™] *split-bridge* serial interface.

10. The method as specified in claim 8 wherein said parallel system bus is based on PCI-*type* or Cardbus-*type* bus standard.

11. The method as specified in claim 8 wherein said serial data is sent at a data rate exceeding 1.0 GHZ.

12. The method as specified in claim 8 wherein said step a) and said step b) are performed in a single electronic device.

13. The method as specified in claim 12 wherein said electronic device comprises a Digital Signal Processor (DSP).

14. The method as specified in claim 8 wherein a retry message is sent in advance of sending said serial data.

15. The method as specified in claim 8 wherein said step a) uses Cardbus electronics.

*16. An interface comprising:*

*first electronics adapted to interface parallel data from a parallel data bus to a first bus; and*

*second electronics configured to interface said parallel data from said parallel data bus into serial data and configured to interface with a second remote bus, said second electronics configured to convert said parallel data into said serial data and, without additional bus wait states, send said serial data to said second remote bus, said second electronics configured to add tag data indicative of a transaction type to the serial data.*

*17. The interface as specified in claim 16 wherein said second electronics comprises split-bridge serial interface electronics.*

*18. The interface as specified in claim 16 wherein said parallel data bus is based on PCI-type or PCMCIA-type interface standards.*

*19. The interface as specified in claim 16 wherein said serial data has a serial data rate exceeding 1.0 Giga bits/second.*

*20. The interface as specified in claim 16 wherein said first electronics comprises a digital signal processor (DSP).*

*21. The interface card as specified in claim 16 wherein said first electronics comprises Cardbus electronics.*

*22. The interface card as specified in claim 16 wherein said first electronics and said second electronics are adapted to support transfer of data to said first bus and said second remote bus, respectively.*

*23. A method of interfacing parallel data on a parallel system bus to a first bus and a second remote bus, comprising:*

*a) converting a first portion of the parallel data on the parallel system bus to parallel data adapted to communicate with said first bus; and*

*b) converting a second portion of the parallel data on the parallel system bus to high-speed serial data, which said serial data is sent, without requiring bus wait states, to the second remote bus, said serial data including a tag indicative of a transaction type.*

*24. The method as specified in claim 23 further comprising the step of using a split-bridge serial interface.*

*25. The method as specified in claim 23 wherein said parallel system bus is based on PCI or Cardbus bus standard.*

*26. The method as specified in claim 23 wherein said serial data is sent at a data rate exceeding 1.0 GHZ.*

*27. The method as specified in claim 23 wherein said step a) and said step b) are performed in a single electronic device.*

*28. The method as specified in claim 27 wherein said electronic device comprises a Digital Signal Processor (DSP).*

*29. The method as specified in claim 23 wherein a retry message is sent in advance of sending said serial data.*

*30. The method as specified in claim 23 wherein said step a) uses Cardbus electronics.*

*31. An interface, comprising:*

*first electronics configured to interface parallel data from a parallel data bus to a first bus; and*

*second electronics configured to interface said parallel data from said parallel data bus into serial data and configured to interface with a second remote bus, said second electronics configured to add tag data indicative of a transaction type to the serial data.*

*32. The interface as specified in claim 31 wherein said parallel data bus is based on PCI standard.*

*33. The interface as specified in claim 31 wherein said second electronics further comprises a data register configured to store said parallel data.*

*34. The interface as specified in claim 33 wherein said second electronics is configured to mirror said data register parallel data to a register of another remote said interface.*

*35. The interface as specified in claim 31 wherein said second electronics is configured to add said tag data during a transaction.*

*36. The interface as specified in claim 35 wherein the second electronics is configured to proceed to a data cycle without delay.*

* * * * *

UNITED STATES PATENT AND TRADEMARK OFFICE

CERTIFICATE OF CORRECTION

PATENT NO. : RE41,494 E
APPLICATION NO. : 11/183298
DATED : August 10, 2010
INVENTOR(S) : Frank W. Ahern et al.

It is certified that error appears in the above-identified patent and that said Letters Patent is hereby corrected as shown below:

In column 1, lines 12-21, delete "This application claims priority of provisional patent application serial No. 60/198,317 entitled Split-Bridge Systems, Applications and Methods of Use Filed on Apr. 19, 2000, as well as co-pending and commonly assigned patent applications Ser. No. 09/130,057 filed Jun. 6, 1998, Ser. No. 09/130,058 filed Jun. 6, 1998, Ser. No. 08/679,131 no issued as U.S. Pat. No. 5,941,965; and co-pending patent application Ser. No. 09/559,678, entitled Modular Computer Based on Universal Connectivity Station, the teaching of each incorporated herein by reference" and insert -- This application claims [priority of provisional patent application serial No. 60/198,317 entitled Split-Bridge Systems, Applications and Methods of Use filed on Apr. 19, 2000, as well as co-pending and commonly assigned patent applications Ser. No. 09/130,057 filed Jun. 6, 1998, Ser. No. 09/130,058 filed Jun. 6, 1998, Ser. No. 08/679,131 now issued as U.S. Pat. No. 5,941,965; and co-pending patent application Ser. No. 09/559,678, entitled Modular Computer Based on Universal Connectivity Station, the teachings of each incorporated herein by reference] *the benefit of U.S. Provisional Application No. 60/198,317, filed April 19, 2000, the teachings of which are hereby incorporated by reference herein. This application is also a continuation-in-part application of U.S. Application No. 09/130,057, filed August 6, 1998, now U.S. Patent No. 6,088,752, the teachings of which are hereby incorporated by reference herein. This application is also a continuation-in-part application of U.S. Application No. 09/130,058, filed August 6, 1998, now U.S. Patent No. 6,070,214, the teachings of which are hereby incorporated by reference herein. This application is also a continuation-in-part application of U.S. Application No. 09/559,678, filed April 27, 2000, the teachings of which are hereby incorporated by reference herein. This application is also related to U.S. Application No. 08/679,131, now US Patent No. 5,941,965, the teachings of which are hereby incorporated by reference herein.* --, therefor.

In column 6, line 62, in Claim 3, delete "PCI-*type* or PCMCIA-*type*" and insert -- [PCI or] PCMCIA --, therefor.

In column 7, line 22, in Claim 10, delete "PCI-*type* or Cardbus-*type*" and insert -- [PCI or] *a* Cardbus --, therefor.

Signed and Sealed this
Twelfth Day of July, 2011

David J. Kappos

David J. Kappos
*Director of the United States Patent and Trademark Office*

In column 7, line 51, in Claim 18, delete "*PCI-type or PCMCIA-type*" and insert -- *PCMCIA* --, therefor.

In column 8, line 22, in Claim 25, delete "*PCI or Cardbus*" and insert -- *Cardbus* --, therefor.

In column 8, line 43, in Claim 32, delete "*PCI*" and insert -- *a Cardbus* --, therefor.